US011279478B2

(12) United States Patent
Fenny et al.

(10) Patent No.: US 11,279,478 B2
(45) Date of Patent: Mar. 22, 2022

(54) TILTING CLOSED-WING AIRCRAFT

(71) Applicant: Bell Helicopter Textron Inc., Fort Worth, TX (US)

(72) Inventors: Carlos Alexander Fenny, Fort Worth, TX (US); Nicholas Brodeur, Beaconsfield (CA); Rohn Lee Olson, Hurst, TX (US); Kevin Morris, Hawesbury (CA)

(73) Assignee: Textron Innovations Inc., Providence, RI (US)

( * ) Notice: Subject to any disclaimer, the term of this patent is extended or adjusted under 35 U.S.C. 154(b) by 114 days.

(21) Appl. No.: 16/444,686

(22) Filed: Jun. 18, 2019

(65) Prior Publication Data

US 2020/0398977 A1 Dec. 24, 2020

(51) Int. Cl.
*B64C 29/00* (2006.01)
*B64C 39/06* (2006.01)
*B64C 3/10* (2006.01)

(52) U.S. Cl.
CPC ............ *B64C 29/0033* (2013.01); *B64C 3/10* (2013.01); *B64C 39/06* (2013.01)

(58) Field of Classification Search
CPC ....... B64C 29/0033; B64C 39/06; B64C 3/10; B64C 39/062
See application file for complete search history.

(56) References Cited

U.S. PATENT DOCUMENTS

| 1,963,676 | A | * | 6/1934 | Powell | B64C 27/28 |
| | | | | | 244/17.19 |
| 2,063,030 | A | * | 12/1936 | Crouch | B64C 3/385 |
| | | | | | 244/7 C |
| 3,035,789 | A | * | 5/1962 | Young | B64C 29/0033 |
| | | | | | 244/7 C |
| 3,107,882 | A | * | 10/1963 | Matteson | B64C 29/0033 |
| | | | | | 244/7 C |
| 5,765,777 | A | * | 6/1998 | Schmittle | B64C 3/385 |
| | | | | | 244/17.25 |
| D796,414 | S | | 9/2017 | Fenny et al. | |
| D798,794 | S | | 10/2017 | Fenny et al. | |
| D798,795 | S | | 10/2017 | Fenny et al. | |
| 10,370,095 | B2 | * | 8/2019 | Won | B64C 29/02 |
| 10,633,092 | B2 | * | 4/2020 | Willford | G05D 1/0055 |
| 2010/0230547 | A1 | * | 9/2010 | Tayman | B64C 39/024 |
| | | | | | 244/7 C |
| 2011/0168835 | A1 | * | 7/2011 | Oliver | B64D 27/12 |
| | | | | | 244/12.4 |

(Continued)

OTHER PUBLICATIONS

American Helicopter Museum & Education Center, "Sundiata Cowels Schools AHMEC in VTOL Model 49," http://americanhelicopter.museum/blog/sundiata-cowels-schools-ahmec-vtol-model-49, Feb. 22, 2017, 3 pages.

(Continued)

*Primary Examiner* — Assres H Woldemaryam

(74) *Attorney, Agent, or Firm* — Lightfoot & Alford PLLC

(57) ABSTRACT

An aircraft that is convertible between a helicopter mode and an airplane mode. The aircraft includes a fuselage with a longitudinal axis and a vertical axis and distributed propulsion array that surrounds the vertical axis when the aircraft is operating the helicopter mode and surrounds the longitudinal axis when the aircraft is operating in the airplane mode.

18 Claims, 15 Drawing Sheets

(56) References Cited

U.S. PATENT DOCUMENTS

| | | | | |
|---|---|---|---|---|
| 2011/0315827 A1* | 12/2011 | Collins | ............... | B64C 29/0033 244/7 A |
| 2012/0261523 A1* | 10/2012 | Shaw | ....................... | B64C 27/28 244/7 R |
| 2014/0099853 A1* | 4/2014 | Condon | ................. | A63F 13/245 446/37 |
| 2016/0016652 A1* | 1/2016 | Barrett | ................. | A63H 33/003 244/15 |
| 2017/0369161 A1* | 12/2017 | Alzahrani | ............ | B64C 29/0033 |
| 2018/0002012 A1* | 1/2018 | McCullough | .......... | B64D 25/12 |
| 2018/0186445 A1 | 7/2018 | Fenny et al. | | |
| 2018/0215462 A1 | 8/2018 | Fenny et al. | | |
| 2018/0244364 A1 | 8/2018 | Fenny et al. | | |
| 2018/0244376 A1 | 8/2018 | Fenny et al. | | |
| 2018/0244381 A1 | 8/2018 | Fenny et al. | | |
| 2018/0251226 A1 | 9/2018 | Fenny et al. | | |
| 2018/0257772 A1* | 9/2018 | Bernhardt | ............... | B64C 35/00 |
| 2018/0281941 A1* | 10/2018 | Hutson | .................. | B64C 39/024 |
| 2018/0305005 A1* | 10/2018 | Parks | ..................... | B64D 27/24 |
| 2018/0362169 A1* | 12/2018 | Du | ......................... | H02K 7/108 |
| 2019/0009899 A1* | 1/2019 | Tian | ........................ | B64C 39/04 |
| 2019/0152593 A1* | 5/2019 | Castellano Aldave | ....................... | B64C 29/0016 |
| 2020/0010182 A1* | 1/2020 | Renteria | ................. | A63H 27/02 |

OTHER PUBLICATIONS

Narushevich Ring Wing Aircraft, https://www.jetphotos.com/photo/8724938, Oct. 12, 2017, 2 pages.

Parsifal, "Parsifal Project will be present at TRA 2018 (Vienna) and ILA 2018 (Berlin)," http://parsifalproject.eu/2018/03/28/parsifal-project-will-present-tra-2018-vienna-ila-2018-berlin/, Mar. 28, 2018.

Volocopter, "Our High Flier: The Volocopter 2X," https://www.volocopter.com/en/product/, accessed Jun. 13, 2019, 7 pages.

* cited by examiner

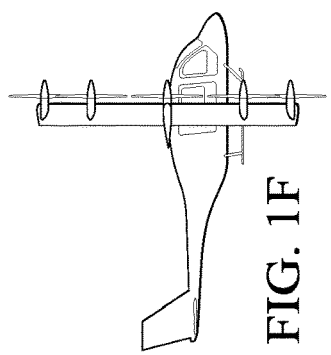
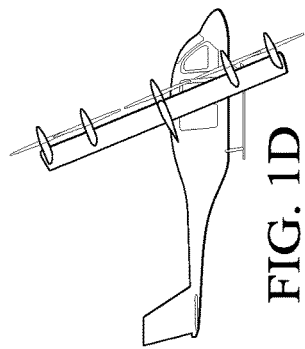
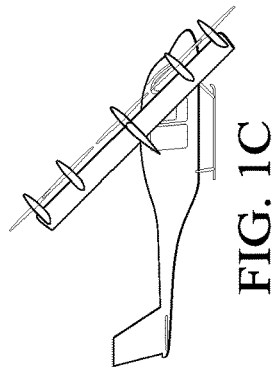
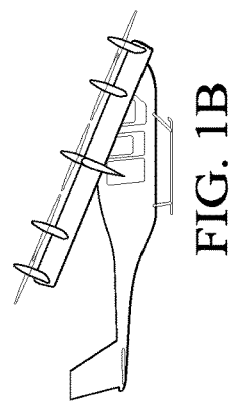
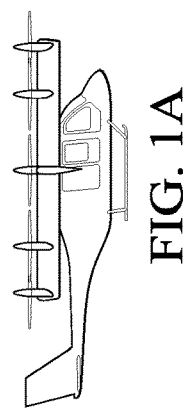

TILTING CLOSED-WING AIRCRAFT

BACKGROUND

Similar to tiltrotor aircraft, tiltwing aircraft aspire to combine the vertical takeoff and landing, as well as hovering, capabilities of a traditional helicopter with the range and speed of an airplane. In order to accomplish this goal, tiltwing aircraft generally include a wing with a pair of thrusters coupled thereto, wherein the wing and the thrusters rotate together between a helicopter mode, wherein the wing and thrusters are vertically oriented, and an airplane mode, wherein the wing and thruster are horizontally oriented. As such, the thrusters provide lift and directional thrust during low speed horizontal movement and the thrusters provide forward thrust while the wing provides lift while operating in the airplane mode. However, tiltwing aircraft have failed to realize commercial viability because they tend to be unstable in helicopter mode. This is because when the wing of a traditional tiltwing aircraft is vertically oriented it presents a large planar surface area that can cause unpredictable yaw from crosswinds.

BRIEF DESCRIPTION OF THE DRAWINGS

FIGS. 1A-1F are side views of an aircraft including a tilting closed-wing, according to this disclosure, transitioning from a helicopter mode to an airplane mode.

DETAILED DESCRIPTION

Figure 2:
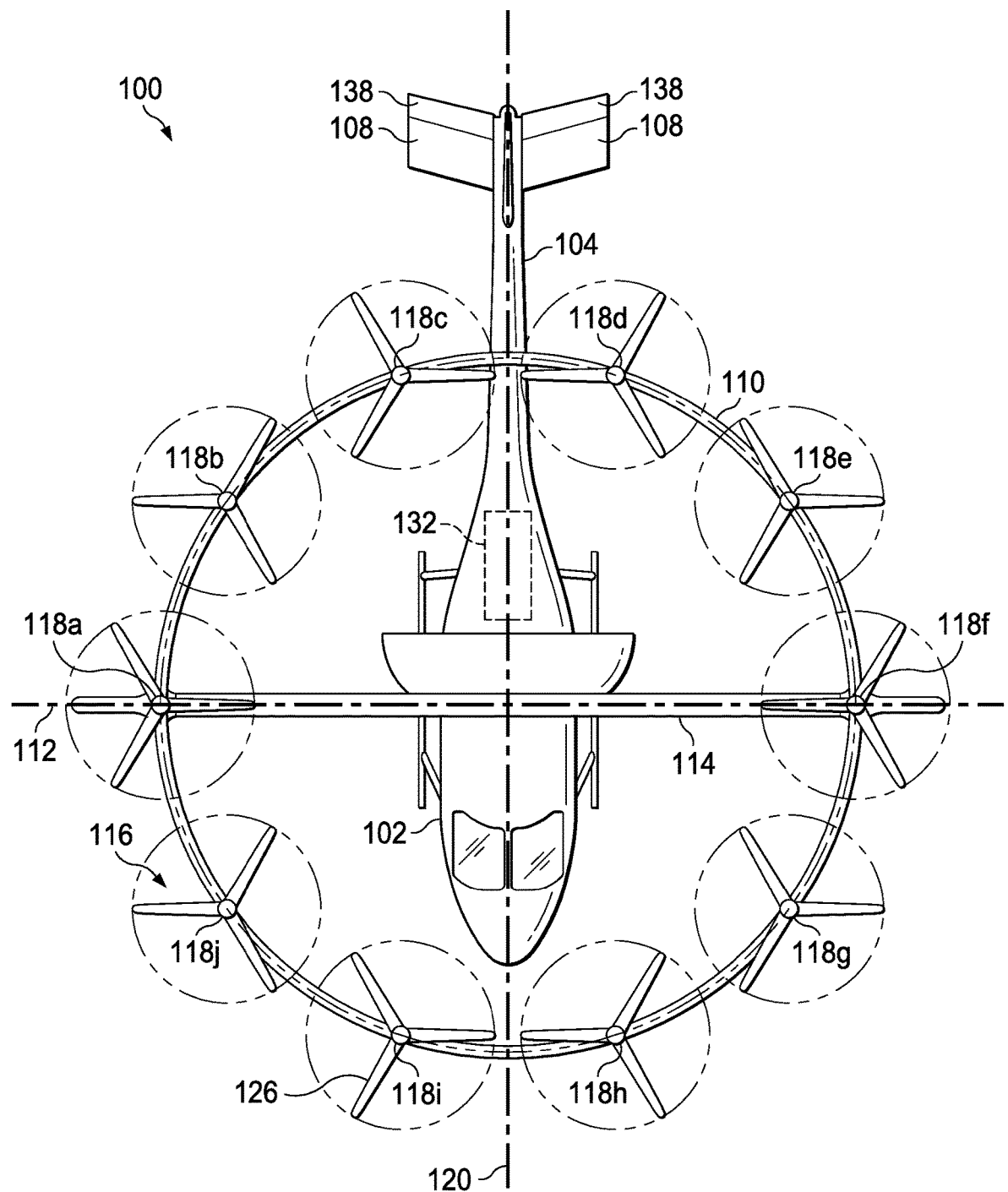
FIG. 2 is a top view of the aircraft of FIG. 1 in the helicopter mode.

While the making and using of various embodiments of this disclosure are discussed in detail below, it should be appreciated that this disclosure provides many applicable inventive concepts, which can be embodied in a wide variety of specific contexts. The specific embodiments discussed herein are merely illustrative and do not limit the scope of this disclosure. In the interest of clarity, not all features of an actual implementation may be described in this disclosure. It will of course be appreciated that in the development of any such actual embodiment, numerous implementation-specific decisions must be made to achieve the developer's specific goals, such as compliance with system-related and business-related constraints, which will vary from one implementation to another.

In this disclosure, reference may be made to the spatial relationships between various components and to the spatial orientation of various aspects of components as the devices are depicted in the attached drawings. However, as will be recognized by those skilled in the art after a complete reading of this disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction. In addition, the use of the term "coupled" throughout this disclosure may mean directly or indirectly connected, moreover, "coupled" may also mean permanently or removably connected, unless otherwise stated.

This disclosure divulges a tilting closed-wing aircraft that is convertible between a helicopter mode and an airplane mode. The aircraft may include a fuselage configured to carry passengers and/or cargo rotatably coupled to a closed wing that includes a distributed propulsion array, comprising a plurality of propellers with cyclically and/or collectively variable pitch blades, coupled thereto. The distributed propulsion array may be part of distributed propulsion system that may include a plurality of electric motors distributed about the closed wing for providing rotational energy to the plurality of propellers, a plurality of electronic speed controllers for controlling the rotational velocities of the plurality of propellers, and a power source for providing electrical energy to the plurality of electric motors, housed within the fuselage.

The distributed propulsion array may preferably have a symmetric distribution of propellers about the closed wing. This configuration, along with the ability to vary the direction and/or the magnitude of the thrust produced by each of the plurality of propellers individually, provides maximum controllability in helicopter mode and provides additional safety in the event of a motor failure, as the differential thrust vectoring allows the aircraft to operate even if one of the propellers is no longer operable. A circular configuration of the closed wing also provides additional stability in helicopter mode as it minimizes crosswind induced yaw. While the aircraft is operating in airplane mode, the closed wing provides lift and the distribution of the plurality of propellers having differential thrust control encircling the fuselage provides maximum controllability in forward flight. In addition, the differential thrust control of the plurality of propellers positioned around the closed wing enables the closed wing to rotate relative to the fuselage without, or with minimal contribution from, actuators utilized on a conventional tiltwing aircraft. Moreover, the distributed propulsion array being positioned around the closed wing minimizes bending moments and enables the aircraft to have a lighter and stiffer structure compared with a disturbed propulsion array along a straight wing.

FIGS. 1A-7 show an aircraft 100 that is convertible between a helicopter mode, which allows for vertical takeoff and landing, hovering, and low-speed directional movement (shown in FIGS. 1A and 2-4) and an airplane mode, which allows for high-speed forward-flight (shown in FIGS. 1F and 5-7). FIGS. 1A-1F show the conversion of aircraft 100 from helicopter mode to airplane mode, wherein FIGS. 1B-1D show aircraft 100 in a conversion mode. Aircraft 100 may be configured as a manned or unmanned aircraft.

Figure 3:
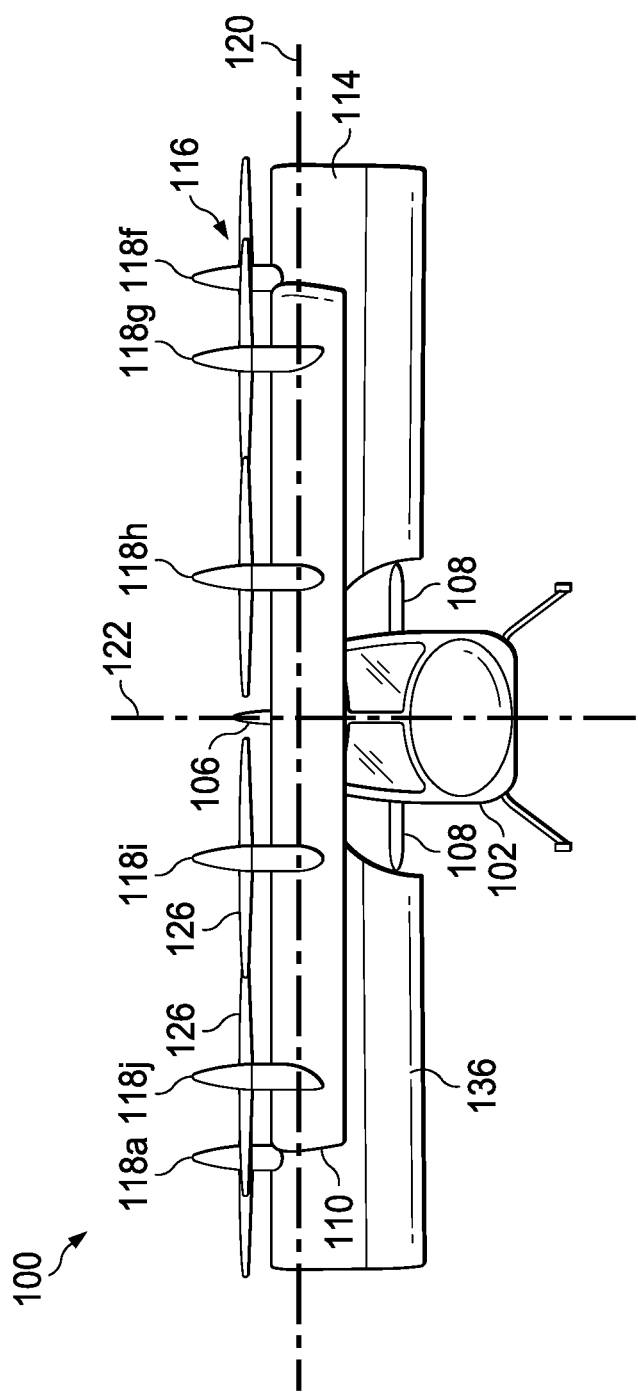
FIG. 3 is a front view of the aircraft of FIG. 1 in the helicopter mode.
Figure 4:
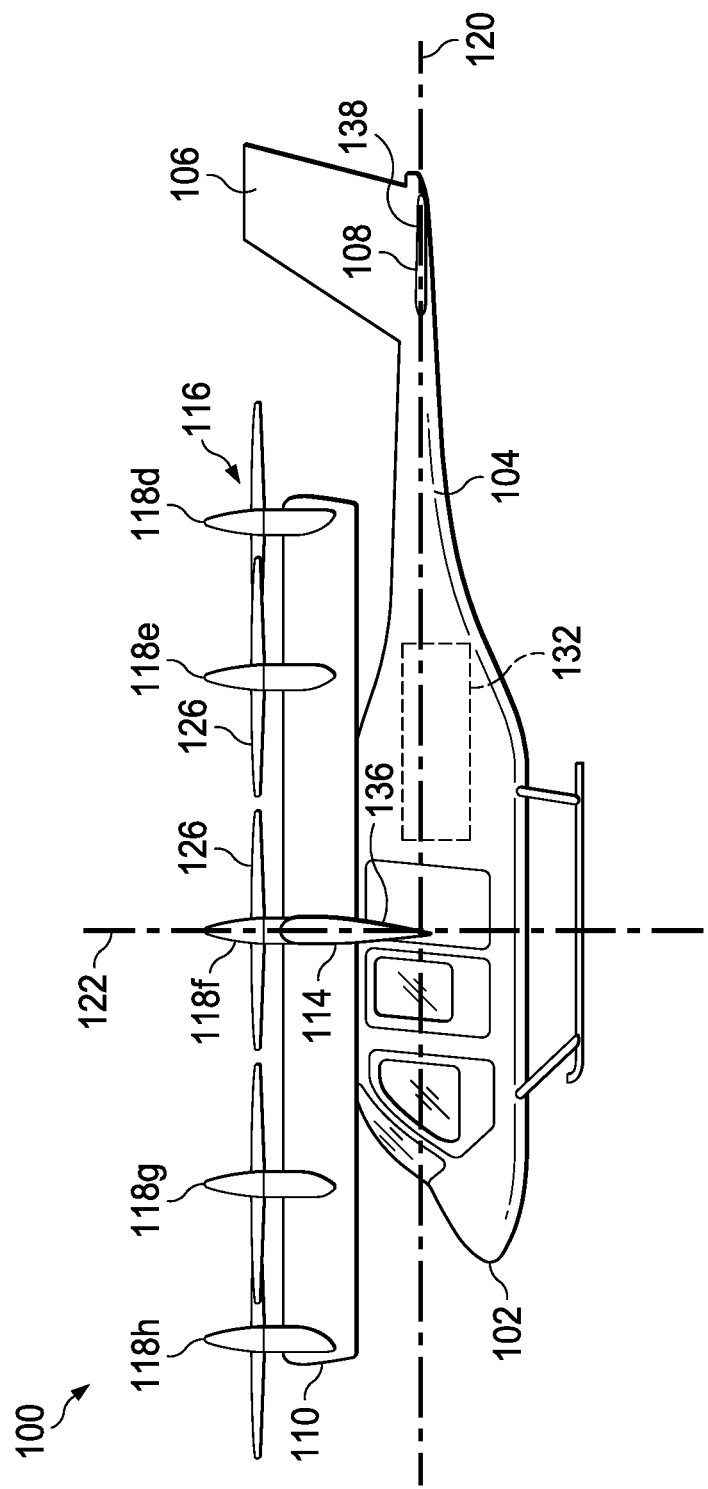
FIG. 4 is a side view of the aircraft of FIG. 1 in the helicopter mode.
Figure 5:
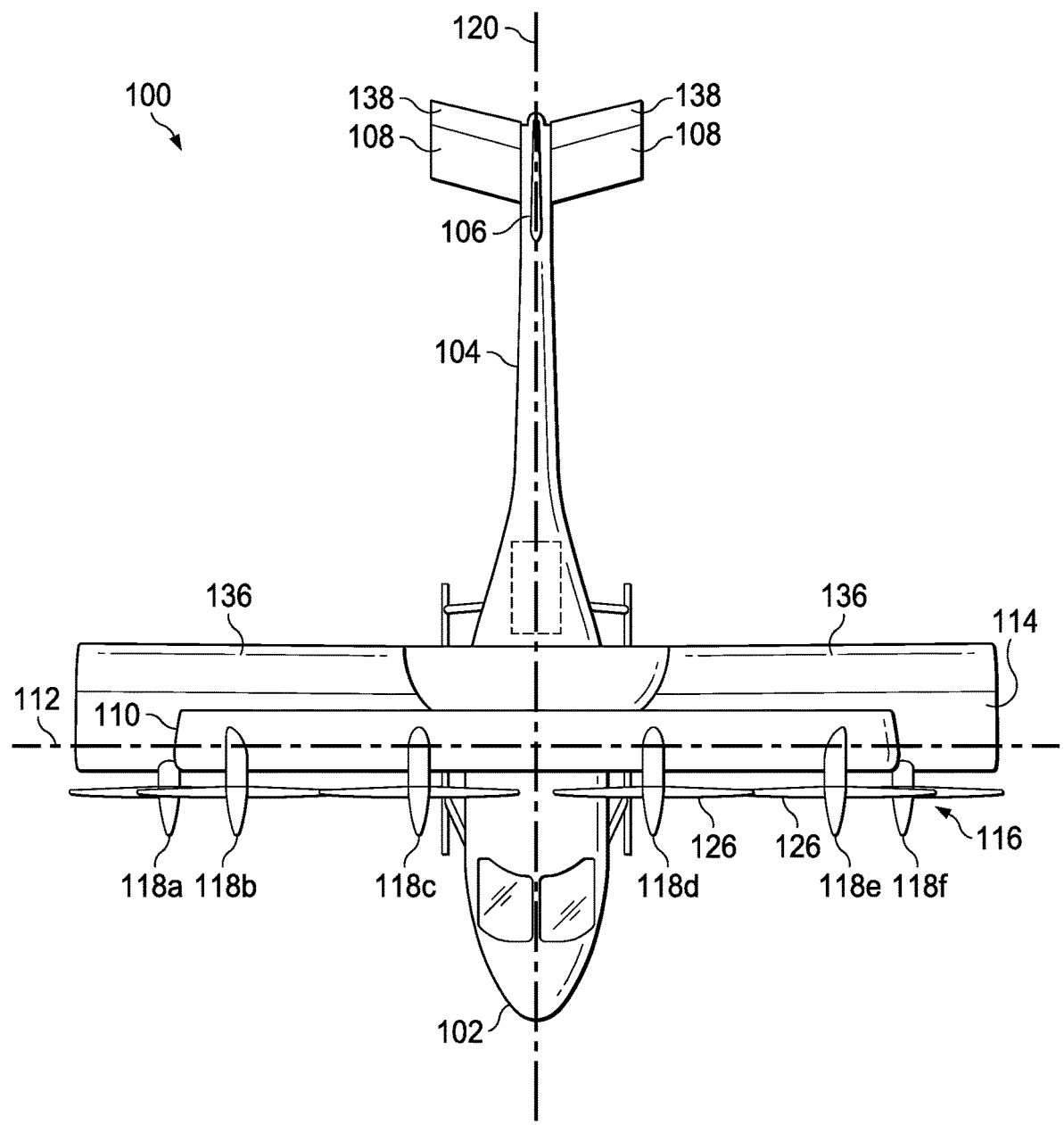
FIG. 5 is a top view of the aircraft of FIG. 1 in the airplane mode.
Figure 6:
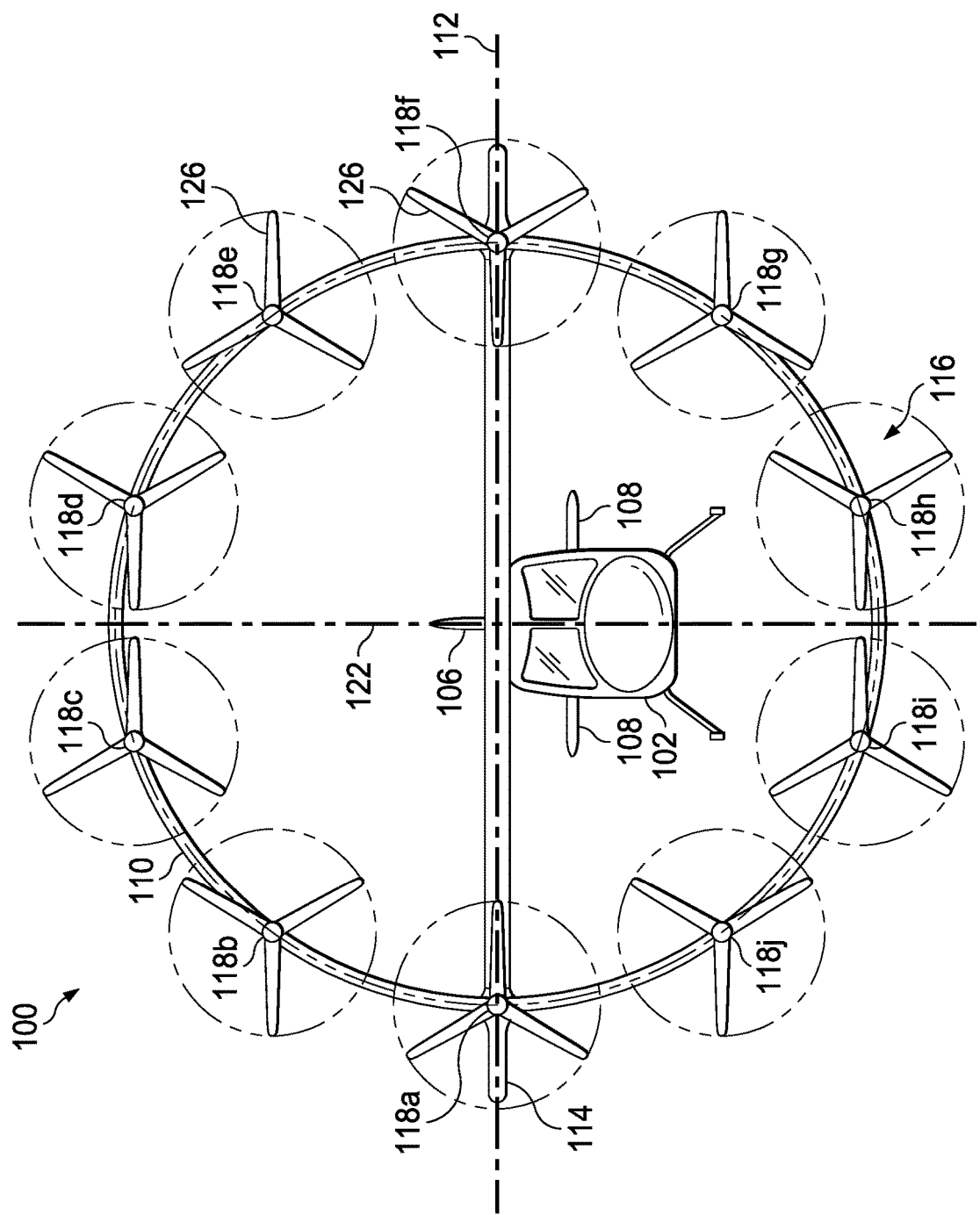
FIG. 6 is a front view of the aircraft of FIG. 1 in the airplane mode.
Figure 7:
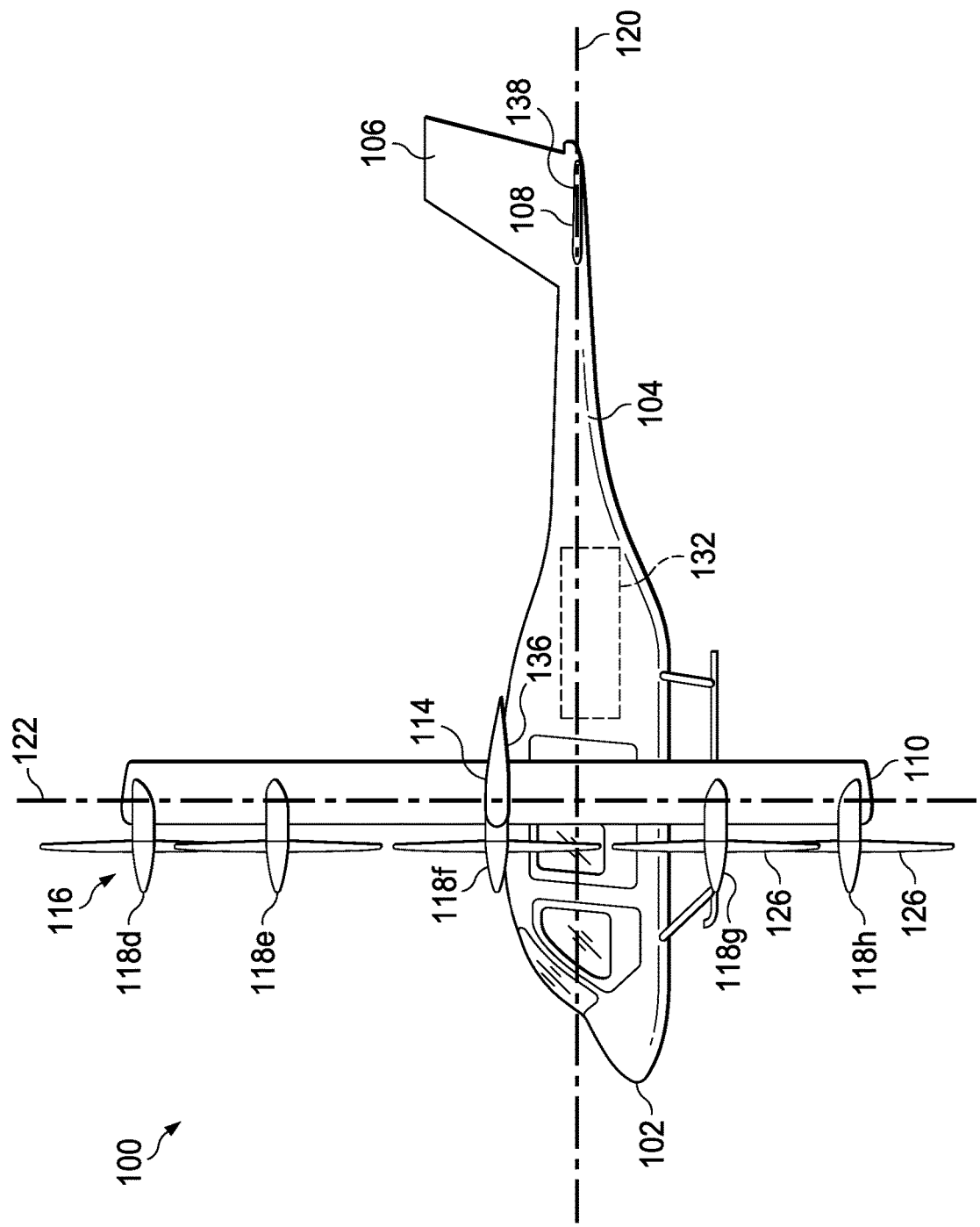
FIG. 7 is a side view of the aircraft of FIG. 1 in the airplane mode.

Still referring to FIGS. 1A-7, aircraft 100 includes a fuselage 102 configured to carry passengers and/or cargo, a tail section 104 including a vertical stabilizer 106 and horizontal stabilizers 108, a closed wing 110 rotatably coupled to fuselage 102 about a tilt axis 112 via a spoke wing 114 configured to rotate with closed wing 114, and a distributed propulsion array 116 comprising a plurality of propellers 118 distributed around closed wing 110. Aircraft 100 is shown with distributed propulsion array 116 having ten propellers 118a-118j equally distributed in a circular pattern around closed wing 110, which has a circular shape. Put another way, propellers 118 are angularly distributed about a center of the closed wing 110 pattern so that a substantially equal angle exists between adjacent propellers 118. However, distributed propulsion array 116 may include as few as three propellers 118 or may include more than three propellers 118 with no upper limit on the number of propellers 118, and closed wing 110 may alternatively comprise an oval, a regular or irregular polygon including but not limited to: a triangle, a square, a pentagon, a hexagon, a heptagon, an octagon, a nonagon, and a decagon, or any other shape forming a closed loop, and therefore, distributed propulsion array 116 may comprise any of those shapes. Fuselage 102 defines a longitudinal axis 120 orthogonal to tilt axis 112 and generally corresponding to the forward direction of travel of aircraft 100 and defines a vertical axis 122 orthogonal to longitudinal axis 120 and tilt axis 112. Propellers 118 are shown as equidistant from vertical axis 122 while aircraft 100 is in the helicopter mode, but they need not be. As shown in FIGS. 2-4, distributed propulsion array 116 is positioned above fuselage 102 and surrounds vertical axis 122 while aircraft 100 is in helicopter mode, and as shown in FIGS. 5-7, distributed propulsion array 116 surrounds longitudinal axis 120, and propellers 118g-118j are below fuselage 102 while aircraft 100 is in airplane mode.

A distributed propulsion system 124, including distributed propulsion array 116, is configured to provide thrust and maneuverability to aircraft 100 in both helicopter mode and airplane mode. Maneuverability is facilitated by modifying at least one of a direction and a magnitude of thrust produced by at least one of propellers 118. Modifying the direction of the thrust produced by propellers 118 is facilitated by cyclically pitching blades 126 of propellers 118. Alternatively, propellers 118 may be coupled to a gimbal which provides one or two axes of freedom to the thrust direction. The magnitude of the thrust produced by propellers 118 may be modified by at least one of collectively pitching blades 126 and modifying the rotational velocity of propellers 118. No anti-torque and/or yaw control device is required because alternating propellers 118 are configured to rotate in opposing directions and yaw control is provided by directional control of the thrust produced by propellers 118.

Figure 8:
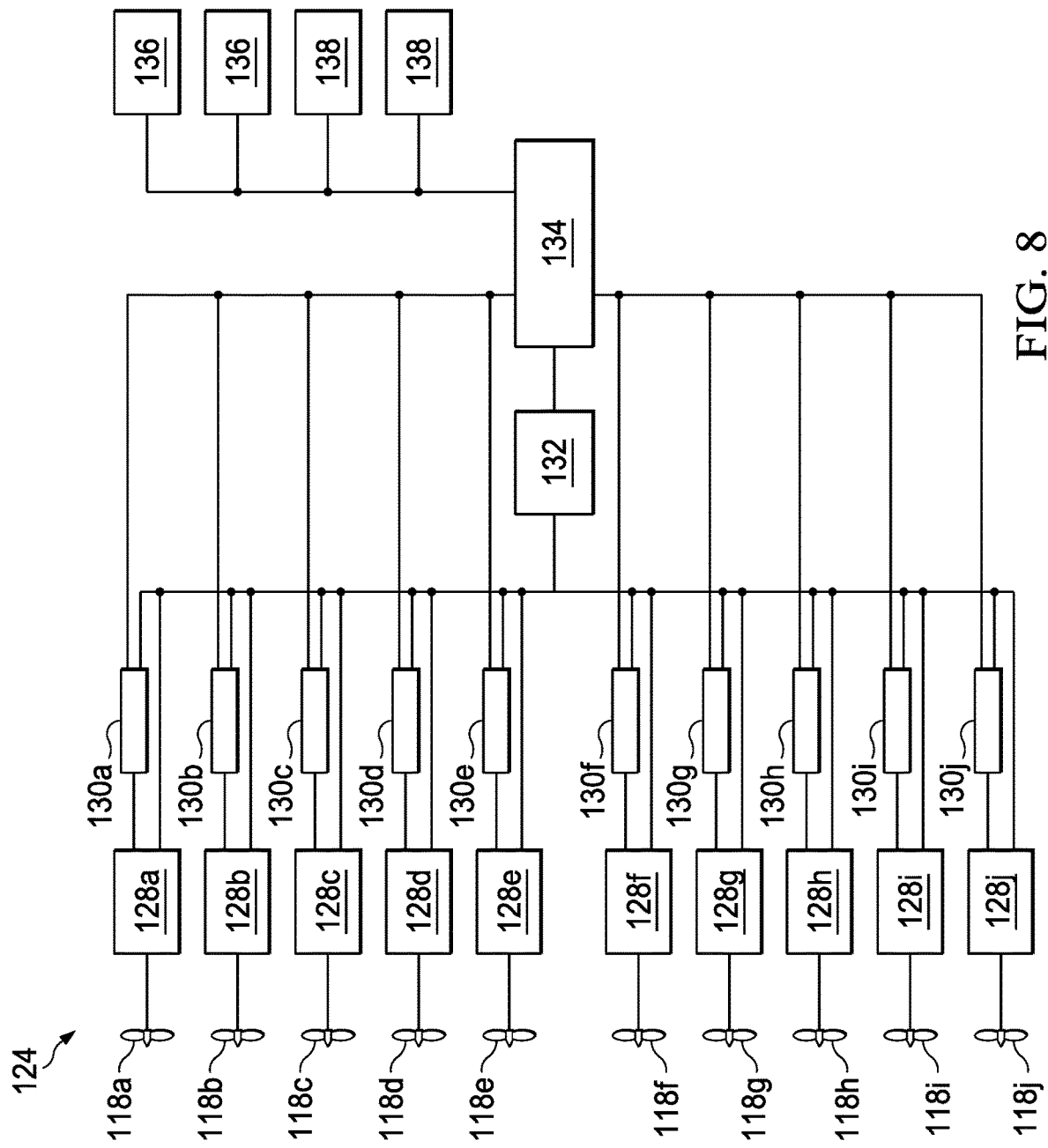
FIG. 8 is a schematic view of a distributed propulsion system of the aircraft of FIG. 1.

As shown in FIG. 8, distributed propulsion system 124 includes collectively and cyclically variable pitch propellers 118a-118j, a plurality of electric motors 128a-128j respectively coupled to propellers 118a-118j for providing rotational energy thereto, a plurality of electronic speed controllers 130a-130j configured to individually control the speed of electric motors 128a-128j, and therefore, the rotational velocities of propellers 118a-118j, a power source 132 configured to provide electrical energy to electric motors 128a-128j, electronic speed controllers 130a-130j, and/or a flight control system 134. Power source 132 may comprise a battery, a fuel cell, a generator, or any other apparatus configured to provide electronic energy. Flight control system 134 is configured to control and coordinate the magnitude and direction of thrust produced by each propeller 118a-118j. Further maneuverability of aircraft 100 may be facilitated by a plurality of flight control surfaces optionally controlled by flight control system 134. The flight control surfaces may include flaperons 136 mounted on the trailing edges of spoke wing 114 and elevators 138 mounted on the trailing edges of horizontal stabilizers 108.

As shown in FIGS. 1A and 2-4, a flight of aircraft 100 begins in helicopter mode. In helicopter mode, closed wing 110 is in a first position, wherein closed wing 110 is in a substantially horizontal orientation and propellers 118 are configured to provide lift. After takeoff, aircraft 100 may translate vertically by changing the magnitude of thrust generated by all propellers 118 equally, it may translate horizontally by changing the direction of thrust produced by one or more propellers 118 towards the desired direction, and it may rotate about vertical axis 122 by changing the direction of thrust of one of more pairs of propellers 118 on opposing sides of vertical axis 122. Aircraft 100 may include a locking mechanism configured to lock closed wing 110 into a fixed relationship relative to fuselage 102 in the first position. Accordingly, while locked in the fixed relationship, differential thrust across closed wing 110 may cause closed wing 110 and fuselage 102 to roll, pitch, or yaw in common. Alternatively, fuselage 102 may be free to rotate about tilt axis 112 relative to closed wing 110 during flight. As such, fuselage 102 would yaw and roll in common with closed wing 110, however, fuselage 102 could maintain an independent pitch attitude. During flight of aircraft 100 in helicopter mode, elevators 138 may assist in control of the attitude of fuselage 102.

If faster forward flight or longer-range flight is desired, aircraft 100 may convert from helicopter mode to airplane mode, as shown in FIGS. 1A-1F. Conversion of aircraft 100 from helicopter mode to airplane mode comprises rotating closed wing 110 from the first position to a second position, wherein closed wing 110 is in a substantially vertical orientation and propellers 118 are configured to provide forward thrust while closed wing 110 and spoke wing 114 provide lift. Prior to conversion, closed wing 110 and fuselage 102 should be unlocked from common relation, is so configured, and optionally, maximum forward flight speed in helicopter mode may be attained. Maximizing the forward flight speed will ensure adequate lift is providing by closed wing 110 and spoke wing 114 during and immediately after conversion. Rotation of closed wing 110 relative to fuselage 102 may be accomplished in various manners. For instance, rotation of closed wing 110 relative to fuselage 102 may be accomplished by modifying at least one of the magnitude and direction of the thrust produced by at least one of propellers 118 to create a moment about tilt axis 112. Optionally, the four propellers 118g-118j forward of tilt axis 112 may decrease thrust while the four propellers 118b-118e aft of tilt axis 112 increase thrust, thereby creating the required moment about tilt axis 112. In addition, propellers 118a-118f may be oriented to maximize the lengths of their effective moment arms and propellers 118g-118j may be oriented to minimize the lengths of their effective moment arms. Moreover, deployment of flaperons 136 may assist rotation of closed wing 110 by creating a moment in spoke wing 114. Additionally, aircraft 100 may include one or more actuators coupled between spoke wing 114 and fuselage 102 configured to rotate closed wing 110 relative to fuselage 102, similar to a traditional tiltwing aircraft. Finally, any combination of the above may be utilized. During conversion, elevators 138 may be utilized to control the attitude of fuselage 102.

With closed wing 110 in the second position, aircraft 100 is in airplane mode, as shown in FIGS. 1F and 5-7. Optionally, aircraft 100 may include a locking mechanism configured to lock closed wing 110 and fuselage 102 into a fixed relationship in the second position. In addition to providing forward thrust, propellers 118 may be utilized to maneuver aircraft 100. For example, aircraft 100 may pitch, roll, or yaw by creating the desired moment by altering at least one of the magnitude and direction of the thrust produced by at least one of propellers 118. In addition, aircraft 100 may be able to translate transverse to longitudinal axis 120 while maintain its attitude by directing the thrust produced by all propellers 118 in a parallel direction. While cruising in airplane mode, power to some of propellers 118 may be disrupted to increase efficiency of distributed propulsion system 124. In this case, blades 126 may be pitched to minimize drag and the disengaged propellers 118 allowed to autorotate. In addition to utilizing propellers 118 for maneuverability in airplane mode, flaperons 136 and elevators 138 may be utilized.

Figure 10:
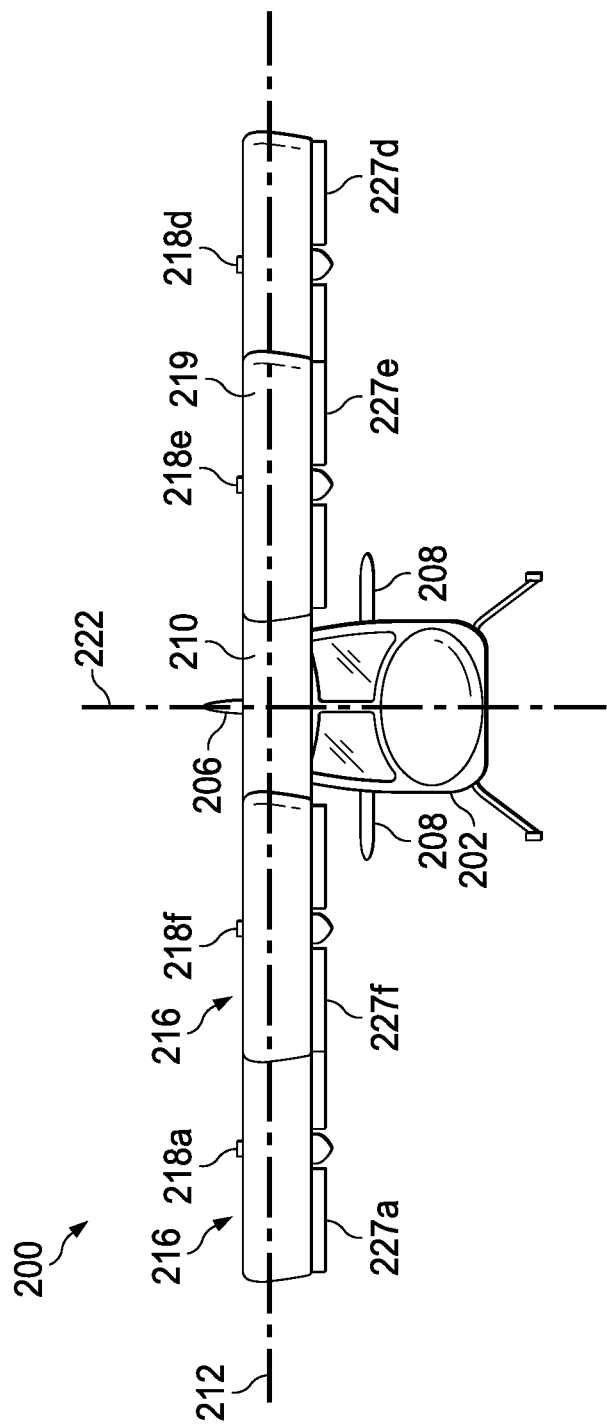
FIG. 10 is a front view of the aircraft of FIG. 9 in the helicopter mode.
Figure 11:
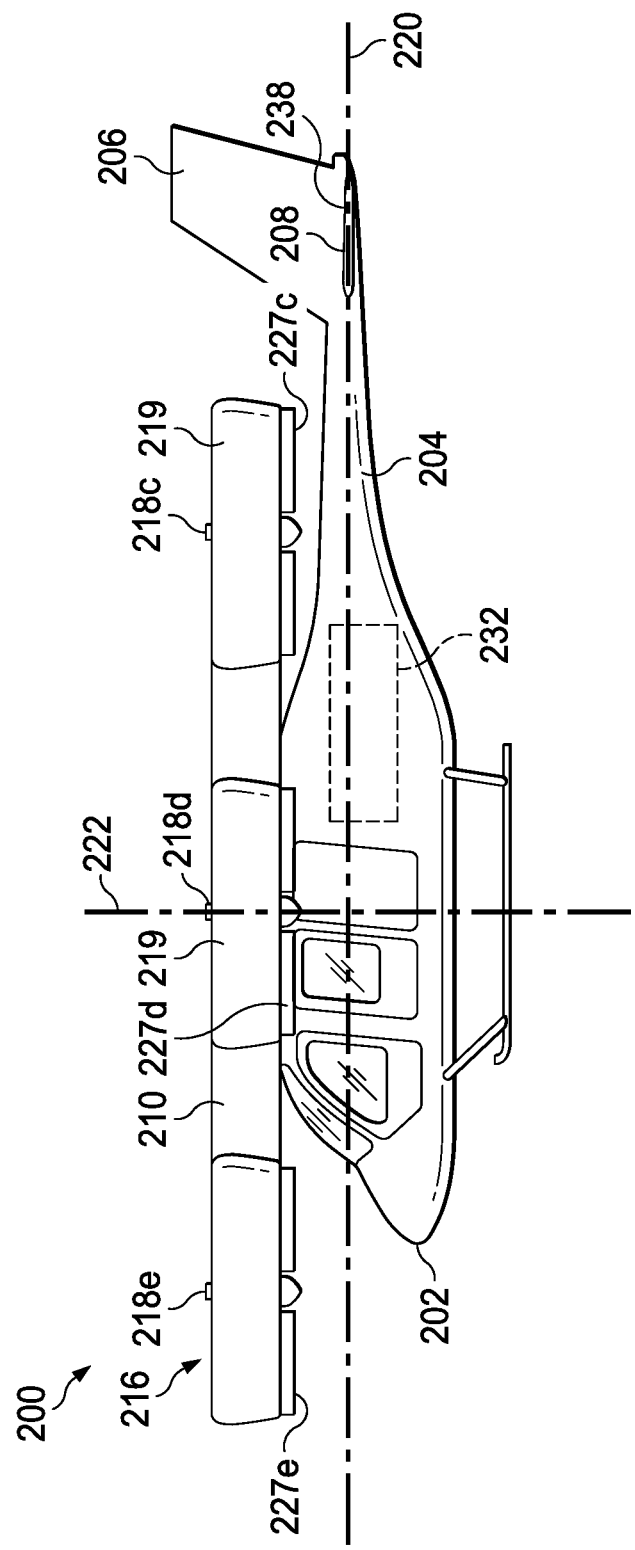
FIG. 11 is a side view of the aircraft of FIG. 9 in the helicopter mode.
Figure 12:
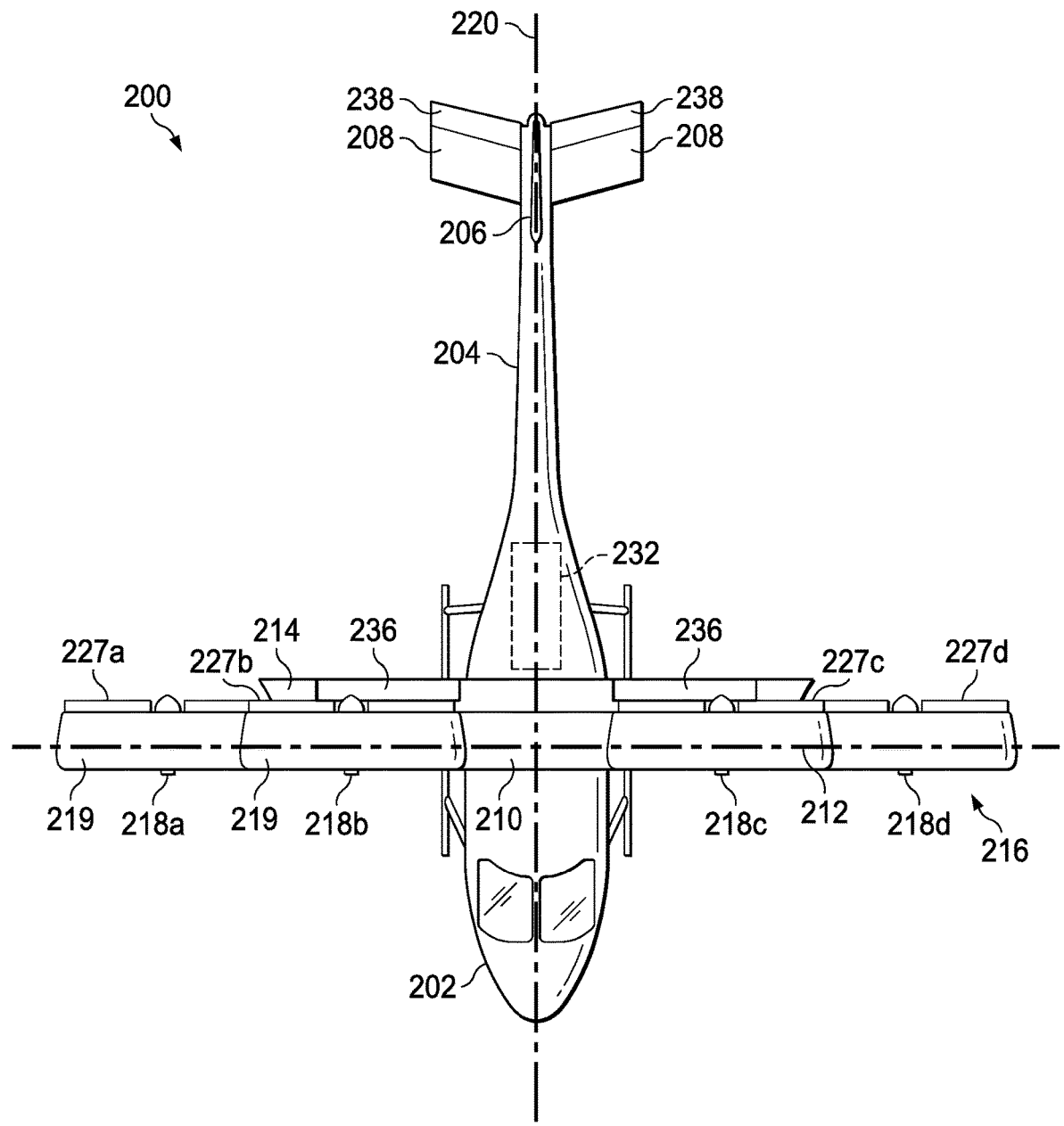
FIG. 12 is a top view of the aircraft of FIG. 9 in an airplane mode.
Figure 13:
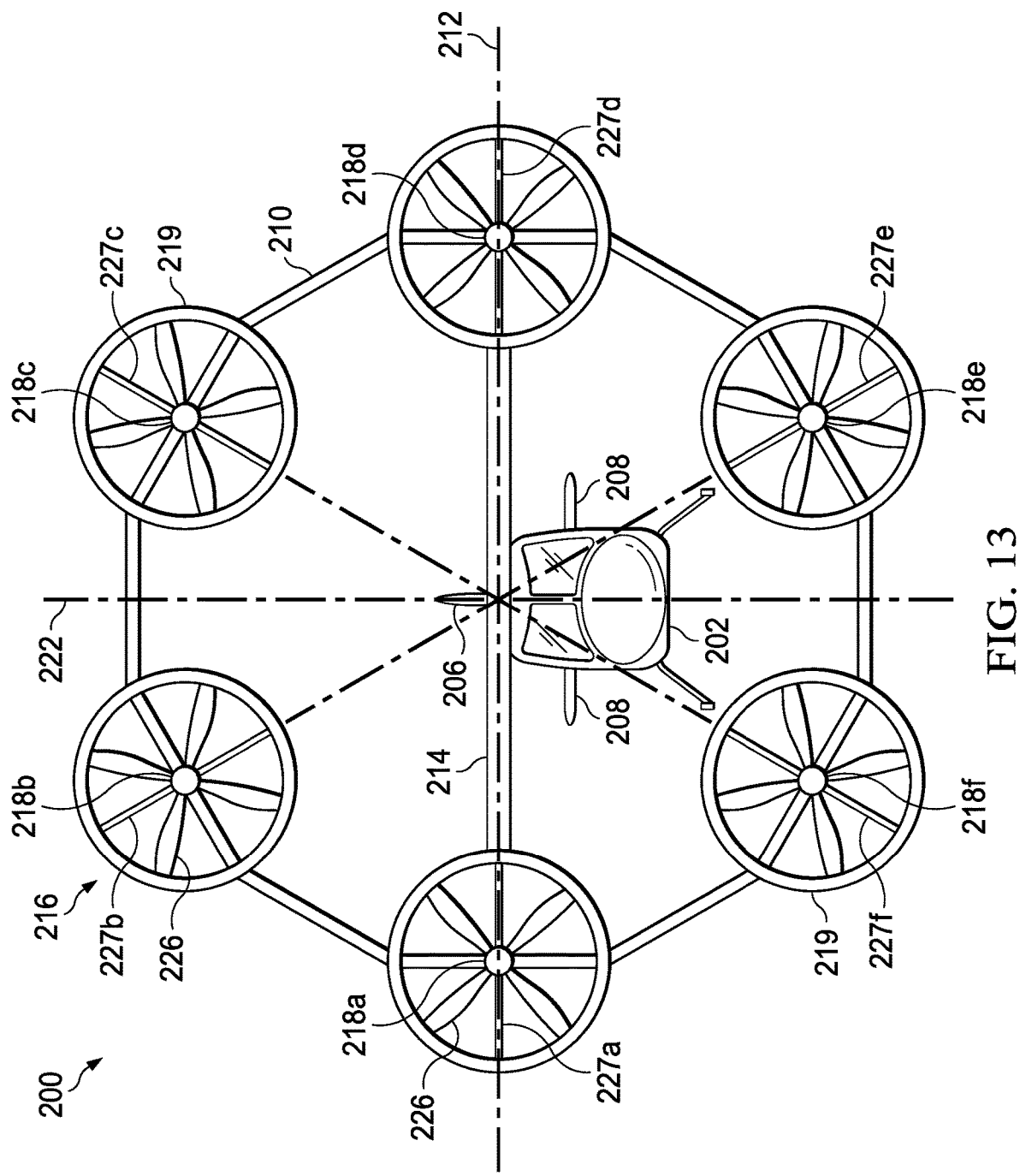
FIG. 13 is a front view of the aircraft of FIG. 9 in the airplane mode.
Figure 14:
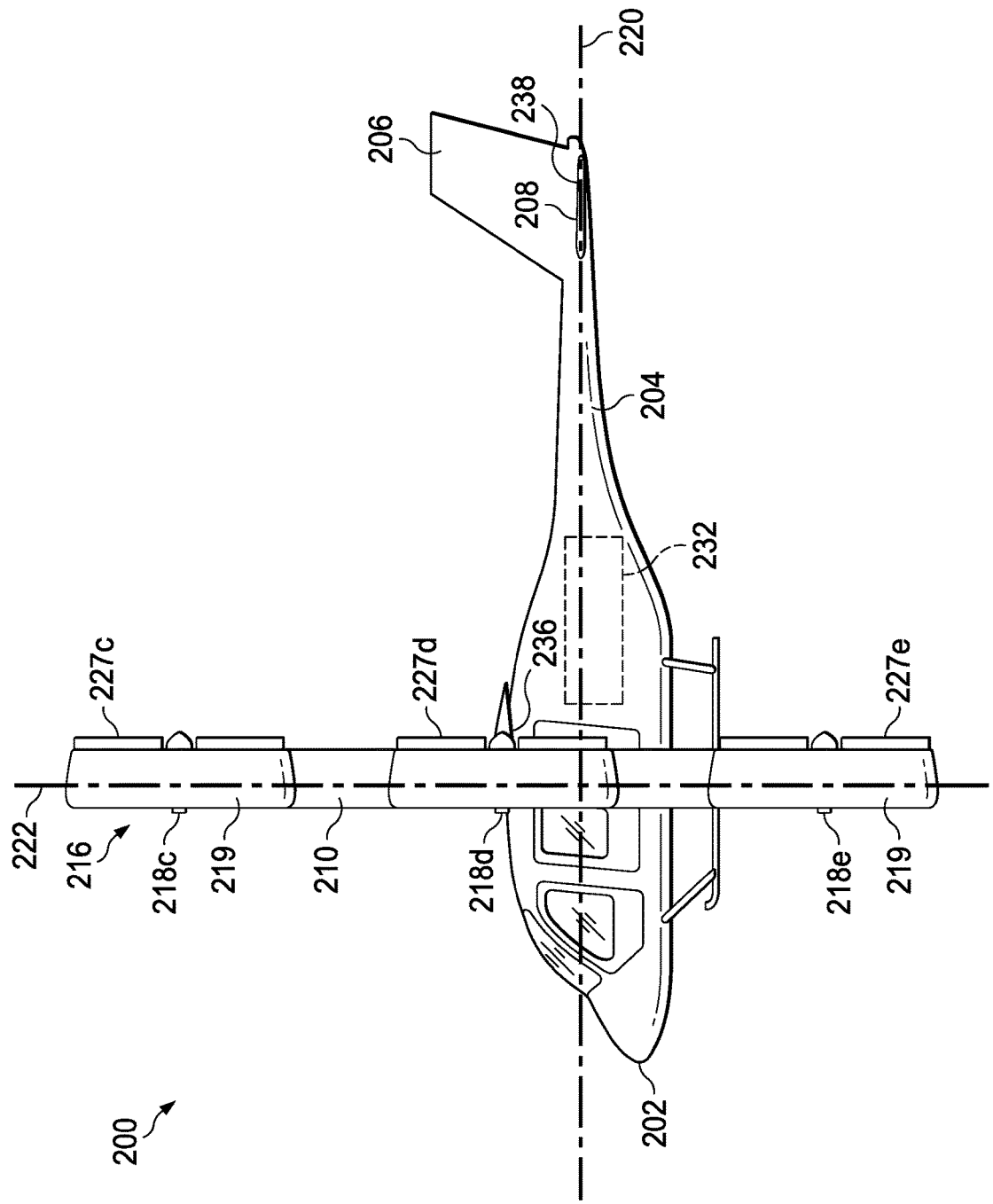
FIG. 14 is a side view of the aircraft of FIG. 9 in the airplane mode.

FIGS. 9-14 show an aircraft 200 that is convertible between a helicopter mode, which allows for vertical takeoff and landing, hovering, and low-speed directional movement (shown in FIGS. 9-11) and an airplane mode, which allows for high-speed forward-flight (shown in FIGS. 12-14). Aircraft 200 may be configured as a manned or unmanned aircraft.

Figure 9:
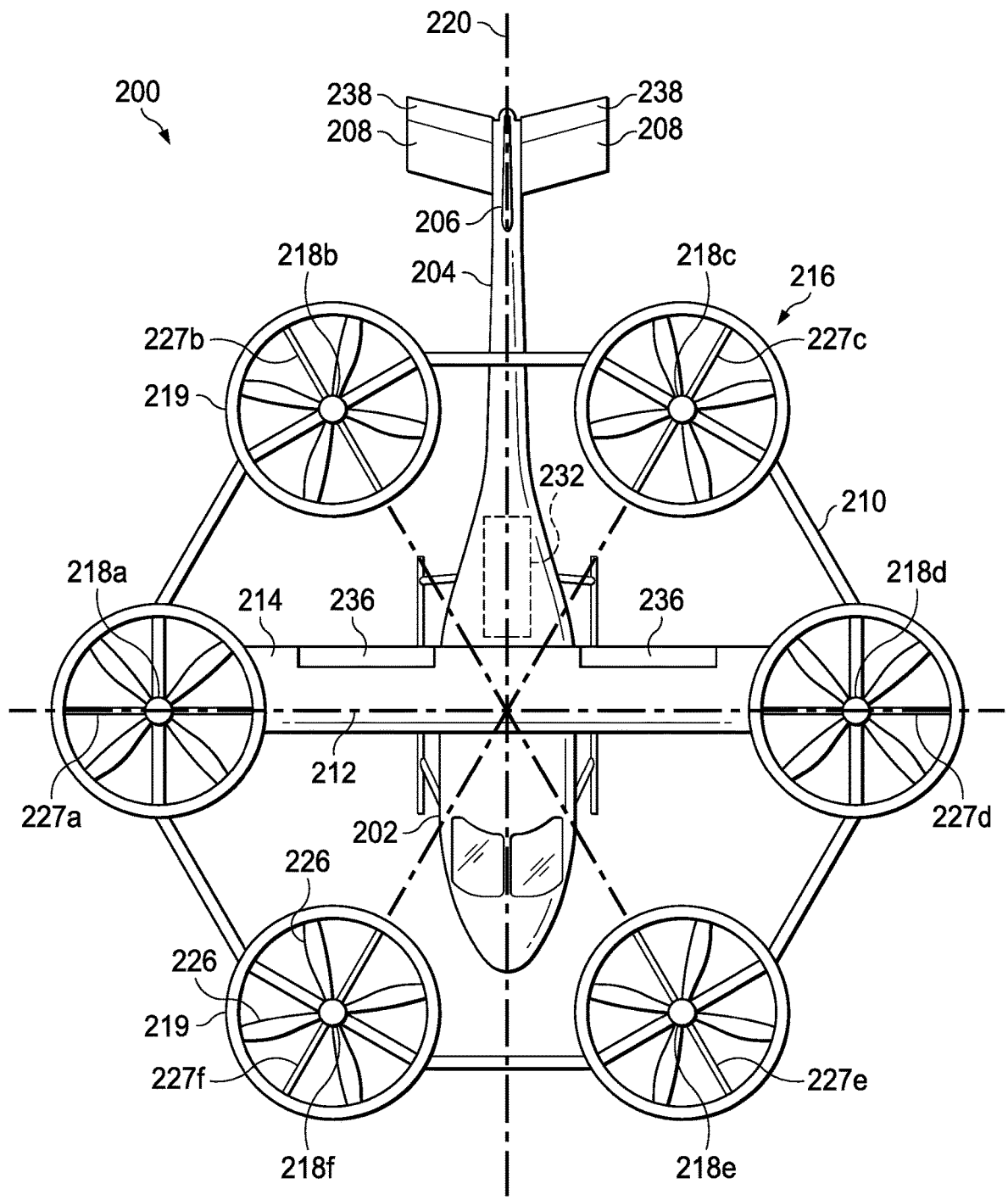
FIG. 9 is a top view of another aircraft including a tilting closed wing, according to this disclosure, in a helicopter mode.

Still referring to FIGS. 9-14, aircraft 200 includes a fuselage 202 configured to carry passengers and/or cargo, a tail section 204 including a vertical stabilizer 206 and horizontal stabilizers 208, a closed wing 210 rotatably coupled to fuselage 202 about a tilt axis 212 via a spoke wing 214 having a fixed relationship to fuselage 202, and a distributed propulsion array 216 comprising a plurality of propellers 218, each encircled by a duct 219, distributed around closed wing 210. Aircraft 200 is shown with distributed propulsion array 216 having six propellers 218a-218f, fitted in ducts 219a-219f, equally distributed in a circular pattern around closed wing 210, which has a hexagonal shape. Put another way, propellers 218 are angularly distributed about a center of the closed wing 210 pattern so that a substantially equal angle exists between adjacent propellers 218. However, distributed propulsion array 216 may include as few as three propellers 218 or may include more than three propellers 118 with no upper limit on the number of propellers 218, and closed wing 210 may alternatively comprise a circle, an oval, a regular or irregular polygon including but not limited to: a triangle, a square, a pentagon, a heptagon, an octagon, a nonagon, and a decagon, or any other shape forming a closed loop, and therefore, distributed propulsion array 216 may comprise any of those shapes. Fuselage 202 defines a longitudinal axis 220 orthogonal to tilt axis 212 and generally corresponding to the forward direction of travel of aircraft 200 and defines a vertical axis 222 orthogonal to longitudinal axis 220 and tilt axis 212. Propellers 218 are shown as equidistant from vertical axis 222 while aircraft 200 is in the helicopter mode, but they need not be. As shown in FIGS. 9-11, distributed propulsion array 216 is positioned above fuselage 202 and surrounds vertical axis 222 while aircraft 200 is in helicopter mode, and as shown in FIGS. 12-14, distributed propulsion array 216 surrounds longitudinal axis 220, and propellers 218e and 218f are below fuselage 202 while aircraft 200 is in airplane mode.

A distributed propulsion system 224, including distributed propulsion array 216, is configured to provide thrust and maneuverability to aircraft 200 in both helicopter mode and airplane mode. Maneuverability may be facilitated by modifying at least one of a direction and a magnitude of thrust produced by at least one of propellers 218. Modifying the direction of the thrust produced by propellers 218 may be facilitated by cyclically pitching blades 226 of propellers 218. Alternatively, or additionally, ducts 219a-219f may be outfitted with rotatable turning vanes 227a-227f at the trailing edges thereof, wherein turning vanes 227 are oriented toward an intersection of tilt axis 212 and vertical axis 222, or the center of closed wing 210. The magnitude of the thrust produced by propellers 218 may be modified by at least one of collectively pitching blades 226 and modifying the rotational velocity of propellers 218. No anti-torque and/or yaw control device is required because alternating propellers 218 are configured to rotate in opposing directions and yaw control is provided by directional control of the thrust produced by propellers 218.

Figure 15:
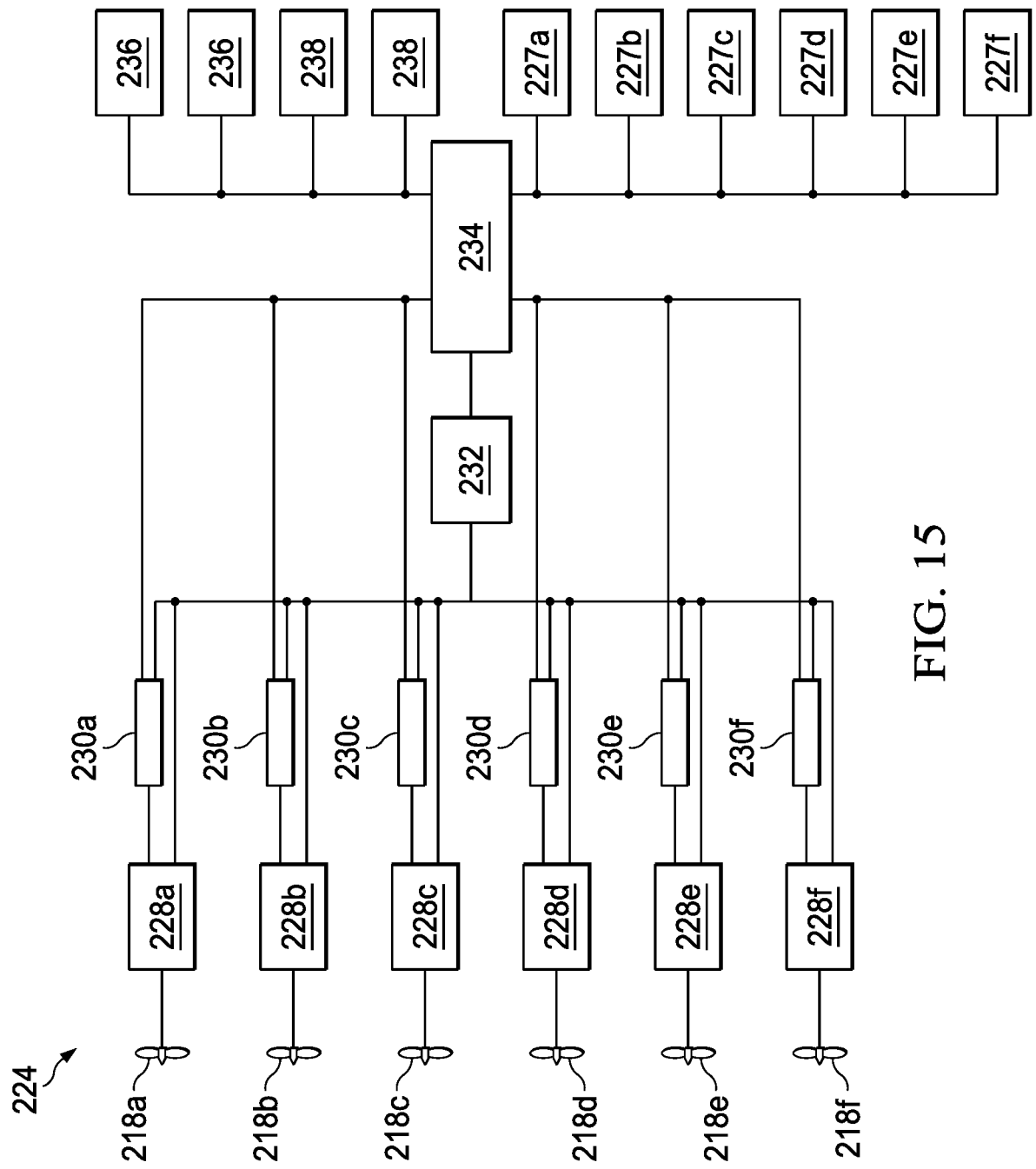
FIG. 15 is a schematic view of a distributed propulsion system of the aircraft of FIG. 9.

As shown in FIG. 15, distributed propulsion system 224 includes variable pitch propellers 218a-218f, a plurality of electric motors 228a-228f respectively coupled to propellers 218a-218f for providing rotational energy thereto, a plurality of electronic speed controllers 230a-230f configured to individually control the speed of electric motors 228a-228f, and therefore, the rotational velocities of propellers 218a-218f, a power source 232 configured to provide electrical energy to electric motors 228a-228f, electronic speed controllers 230a-230f, and/or a flight control system 234. Power source 232 may comprise a battery, a fuel cell, a generator, or any other apparatus configured to provide electronic energy. Flight control system 234 is configured to control and coordinate the magnitude and direction of thrust produced by each propeller 218a-218f. Further maneuverability of aircraft 200 may be facilitated by a plurality of flight control surfaces optionally controlled by flight control system 234. The flight control surfaces may include flaperons 236 mounted on the trailing edges of spoke wing 214, elevators 238 mounted on the trailing edges of horizontal stabilizers 208, as well as turning vanes 227a-227f.

As shown in FIGS. 9-11, a flight of aircraft 200 begins in helicopter mode. In helicopter mode, closed wing 210 is in a first position, wherein closed wing 210 is in a substantially horizontal orientation and propellers 218 are configured to provide lift. After takeoff, aircraft 200 may translate vertically by changing the magnitude of thrust generated by all propellers 218 equally, it may translate horizontally by changing the direction of thrust produced by one or more propellers 218 towards the desired direction, and it may rotate about vertical axis 222 by changing the direction of thrust of one of more pairs of propellers 218 on opposing sides of vertical axis 222. Aircraft 200 may include a locking mechanism configured to lock closed wing 210 into a fixed relationship relative to fuselage 202 in the first position. Accordingly, while locked in the fixed relationship, differential thrust across closed wing 210 may cause closed wing 210 and fuselage 202 to roll, pitch, or yaw in common. Alternatively, fuselage 202 may be free to rotate about tilt axis 212 relative to closed wing 210 during flight. As such, fuselage 202 would yaw and roll in common with closed wing 210, however, fuselage 202 could maintain an independent pitch attitude. During flight of aircraft 200 in helicopter mode, flaperons 236 and elevators 238 may assist in control of the attitude of fuselage 202.

If faster forward flight or longer-range flight is desired, aircraft 200 may convert from helicopter mode to airplane mode, as shown in FIGS. 12-14. Conversion of aircraft 200 from helicopter mode to airplane mode comprises rotating closed wing 210 from the first position to a second position, wherein closed wing 210 is in a substantially vertical orientation and propellers 218 are configured to provide forward thrust while closed wing 210 and spoke wing 214 provide lift. Prior to conversion, closed wing 210 and fuselage 202 should be unlocked from common relation, is so configured, and optionally, maximum forward flight speed in helicopter mode may be attained. Maximizing the forward flight speed will ensure adequate lift is providing by closed wing 210 and spoke wing 214 during and immediately after conversion. Rotation of closed wing 210 relative to fuselage 202 may be accomplished in various manners. For instance, rotation of closed wing 210 relative to fuselage 202 may be accomplished by modifying at least one of the magnitude and direction of the thrust produced by at least one of propellers 218 to create a moment about tilt axis 212. Optionally, the two propellers 218e and 218f forward of tilt axis 212 may decrease thrust while the two propellers 218b and 218c aft of tilt axis 212 increase thrust, thereby creating the required moment about tilt axis 212. In addition, propellers 218a-218d may be oriented to maximize the lengths of their effective moment arms and propellers 218e and 218f may be oriented to minimize the lengths of their effective moment arms. Additionally, aircraft 200 may include one or more actuators coupled between spoke wing 214 and closed wing 210 configured to rotate closed wing 210 relative to fuselage 202, similar to a traditional tiltwing aircraft. Finally, any combination of the above may be utilized. During conversion, flaperons 236 and elevators 238 may be utilized to control the attitude of fuselage 202.

With closed wing 210 in the second position, aircraft 200 is in airplane mode, as shown in FIGS. 12-14. Optionally, aircraft 200 may include a locking mechanism configured to lock closed wing 210 and fuselage 202 into a fixed relationship in the second position. In addition to providing forward thrust, propellers 218 and/or turning vanes 227 may be utilized to maneuver aircraft 200. For example, aircraft 200 may pitch, roll, or yaw by creating the desired moment by altering at least one of the magnitude and direction of the thrust produced by at least one of propellers 218. In addition, aircraft 200 may be able to translate transverse to longitudinal axis 220 while maintain its attitude by directing the thrust produced by all propellers 218 in a parallel direction. While cruising in airplane mode, power to some of propellers 218 may be disrupted to increase efficiency of distributed propulsion system 224. In this case, blades 226 may be pitched to minimize drag and the disengaged propellers 218 allowed to autorotate. In addition to utilizing propellers 218 and/or turning vanes 227 for maneuverability in airplane mode, flaperons 236 and elevators 238 may be utilized.

While aircraft 100 and 200 are described with electrically powered distributed propulsion systems 124 and 224, they may be hydraulically powered, wherein electric motors 128 and 228 hydraulic motors, electronic speed controllers 130 and 230 comprise hydraulic controllers, and power sources 132 and 232 may comprise a hydraulic pump powered electrically by a battery, a fuel cell, a generator, or a hydraulic pump driven by an engine. Moreover, rather than a single power source 132 and 232, each electric motor 228 may have its own individual power source. In addition, aircrafts 100 and 200 and distributed propulsion systems 124 and 224 may be altered to include the features described on the aircraft and the related distributed propulsion system disclosed in U.S. patent application Ser. No. 15/593,575, filed May 12, 2017, which is incorporated herein in its entirety.

At least one embodiment is disclosed, and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 95 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. Also, the phrases "at least one of A, B, and C" and "A and/or B and/or C" should each be interpreted to include only A, only B, only C, or any combination of A, B, and C.

What is claimed is:

1. An aircraft, comprising:
   a fuselage configured to carry at least one of passengers and cargo therein;
   a closed shape wing rotatably coupled to the fuselage, the closed shape wing being rotatable relative to the fuselage about a tilt axis between a first position, wherein the closed shape wing is in a substantially horizontal orientation, to a second position, wherein the closed shape wing is in a substantially vertical orientation; and
   a plurality of propellers coupled to the closed shape wing, each of the plurality of propellers including a plurality of blades coupled thereto, wherein the plurality of propellers are configured to provide lift when the closed shape wing is in the first position and the plurality of propellers are configured to provide forward thrust when the closed shape wing is in the second position,
   wherein the closed shape wing comprises a substantially continuous leading edge along a perimeter of the closed shape wing.

2. The aircraft of claim 1, wherein the aircraft is configured such that rotation of the closed shape wing relative to the fuselage is accomplished at least in part by modifying at least one of a magnitude and a direction of thrust produced by at least one of the plurality of propellers.

3. The aircraft of claim 2, wherein each of the plurality of propellers are configured to modify the magnitude of the thrust produced by at least one of collectively changing pitches of the plurality of blades and changing a rotational velocity of the propeller.

4. The aircraft of claim 3, wherein each of the plurality of propellers are configured to modify the direction of the thrust produced by cyclically changing the pitches of the plurality of blades.

5. The aircraft of claim 4, wherein the aircraft is configured such that maneuverability of the aircraft when the closed shape wing is in the second position is accomplished at least in part by modifying at least one of the magnitude and the direction of the thrust produced by at least one of the plurality of propellers.

6. The aircraft of claim 5, further comprising:
a spoke wing coupled for common rotation about the tilt axis with the closed shape wing, the spoke wing being configured to provide lift when the closed shape wing is in the second position.

7. An aircraft configured to convert between a helicopter mode and an airplane mode, comprising:
a fuselage having a longitudinal axis and a vertical axis orthogonal to the longitudinal axis; and
a distributed propulsion array, wherein the distributed propulsion array surrounds the vertical axis while the aircraft is in the helicopter mode and the distributed propulsion array surrounds the longitudinal axis when the aircraft is in the airplane mode;
wherein the distributed propulsion array is coupled to a closed shape wing rotatably coupled to the fuselage, the closed shape wing comprising a substantially continuous leading edge along a perimeter of the closed shape wing.

8. The aircraft of claim 7, wherein the distributed propulsion array is disposed above the fuselage while the aircraft is in the helicopter mode and the distributed propulsion array surrounds the fuselage while the aircraft is in the airplane mode.

9. The aircraft of claim 8, wherein the closed wing comprises one of a circle, an oval, a triangle, a square, a pentagon, a hexagon, a heptagon, an octagon, a nonagon, and a decagon.

10. The aircraft of claim 9, wherein the distributed propulsion array comprises a plurality of propellers.

11. The aircraft of claim 10, further comprising:
control surfaces configured to assist in control of an attitude of the fuselage.

12. The aircraft of claim 11, further comprising:
a wing coupled to the fuselage configured to provide lift in the aircraft is in the airplane mode.

13. An aircraft configured to convert between a helicopter mode and an airplane mode, comprising:
a fuselage; and
a plurality of propellers, each of the plurality of propellers including a plurality of blades configured to rotate about an axis of rotation;
wherein the plurality of blades of each of the plurality of propellers are positioned above the fuselage in the helicopter mode and the axis of rotation of at least one of the plurality of propellers is below the fuselage in the airplane mode;
a closed shape wing rotatably coupled to a fixed wing, wherein the plurality of propellers are coupled to the closed shape wing, the closed shape wing comprising a substantially continuous leading edge along a perimeter of the closed shape wing.

14. The aircraft of claim 13, further comprising:
a fixed wing coupled to the fuselage.

15. The aircraft of claim 14, further comprising:
a plurality of ducts, wherein each of the plurality of ducts surrounds one of the plurality of propellers.

16. The aircraft of claim 15, further comprising:
a plurality of control surfaces.

17. The aircraft of claim 16, wherein the closed shape wing and the fuselage can be locked into a fixed relationship in the helicopter mode and the airplane mode.

18. The aircraft of claim 17, wherein the closed shape wing is configured to rotate relative to the fuselage without an actuator.

* * * * *